(12) United States Patent
Fuchs et al.

(10) Patent No.: US 8,012,357 B2
(45) Date of Patent: Sep. 6, 2011

(54) MAGNETIC FIELD AND FIELD GRADIENT ENHANCED CENTRIFUGATION SOLID-LIQUID SEPARATIONS

(75) Inventors: Benjamin C. Fuchs, Karlsruhe (DE); Christian Hoffmann, Newark, DE (US); Karsten Keller, Hockessin, DE (US); Christopher M. Rey, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 725 days.

(21) Appl. No.: 11/060,004

(22) Filed: Feb. 17, 2005

(65) Prior Publication Data
US 2006/0281194 A1 Dec. 14, 2006

Related U.S. Application Data

(60) Provisional application No. 60/545,063, filed on Feb. 17, 2004, provisional application No. 60/552,581, filed on Mar. 12, 2004.

(51) Int. Cl.
*B01D 35/06* (2006.01)
*B03C 1/30* (2006.01)

(52) U.S. Cl. ........ 210/695; 210/702; 210/806; 210/223; 210/297; 436/523; 436/524; 436/526; 209/40; 209/214; 209/232

(58) Field of Classification Search ............... 210/695, 210/702, 767, 806, 223, 297; 494/37, 85; 436/523, 524, 526; 209/40, 214, 232; 366/218, 366/244, 249, 274
See application file for complete search history.

(56) References Cited

U.S. PATENT DOCUMENTS

| | | | |
|---|---|---|---|
| 1,527,069 A | 2/1925 | Peck | |
| 1,527,070 A | 2/1925 | Peck | |
| 2,648,636 A | 8/1953 | Sidney et al. | |
| 3,195,728 A | 7/1965 | Sommermeyer | |
| 3,534,902 A | 10/1970 | Gilreath | |
| 3,696,932 A | 10/1972 | Rosenberg | |
| 3,902,994 A * | 9/1975 | Maxwell et al. | ............. 209/232 |
| 4,017,385 A | 4/1977 | Morton et al. | |
| 4,144,163 A | 3/1979 | Kolm | |
| 4,166,788 A | 9/1979 | Druz | |
| 4,238,326 A | 12/1980 | Wolf | |
| 4,279,748 A | 7/1981 | Inoue | |
| 4,784,758 A | 11/1988 | Willis | |
| 5,183,638 A * | 2/1993 | Wakatake | .................... 366/218 |

(Continued)

FOREIGN PATENT DOCUMENTS
EP 659932 6/1995
(Continued)

OTHER PUBLICATIONS
International Search Report Dated May 24, 2005, International Application No. PCT/US2005/005045, International Filing Date: Feb. 17, 2005.

(Continued)

*Primary Examiner* — David A. Reifsnyder

(57) ABSTRACT

This invention relates to a continuous or batch centrifugation solid-liquid separation process comprising simultaneously subjecting the solid-liquid mixture to localized magnetic field gradients and the centrifugation and to improved centrifugation solid-liquid separation processes wherein the improvement comprises simultaneously subjecting the solid-liquid mixture to a homogeneous magnetic field, a magnetic field gradient or both prior to and/or during the centrifugation.

40 Claims, 5 Drawing Sheets

U.S. PATENT DOCUMENTS

| | | |
|---|---|---|
| 5,244,580 A | 9/1993 | Li |
| 5,565,105 A | 10/1996 | Thakor et al. |
| 5,954,933 A | 9/1999 | Ingalls |
| 6,150,182 A | 11/2000 | Cassaday et al. |
| 6,273,265 B1 | 8/2001 | Greenwalt |
| 6,464,863 B1 | 10/2002 | Nguyen |
| 6,517,813 B1 | 2/2003 | Weitschies |
| 7,070,684 B1 | 7/2006 | Fuhr |
| 2003/0146174 A1 | 8/2003 | Hansen |
| 2005/0252864 A1 | 11/2005 | Keller |
| 2005/0261479 A1 | 11/2005 | Hoffmann |
| 2006/0180538 A1 | 8/2006 | Fuchs |
| 2006/0191834 A1 | 8/2006 | Fuchs |
| 2006/0281194 A1 | 12/2006 | Fuchs |

FOREIGN PATENT DOCUMENTS

| | | |
|---|---|---|
| FR | 2128128 | 10/1972 |
| GB | 2153707 | 8/1985 |
| GB | 1490598 | 11/1997 |
| JP | 53-109272 | 9/1978 |
| JP | 58-088043 | 5/1983 |
| JP | 61-106519 | 5/1986 |
| JP | 62-079861 | 4/1987 |
| JP | 09-276624 | 10/1997 |
| JP | 2000-312838 | 11/2000 |
| JP | 2003-144973 | 5/2003 |

OTHER PUBLICATIONS

International Search Report and Written Opinion in International Applic. No. PCT/US2005/005043 dated Sep. 9, 2009 (European Patent Office).

International Search Report and Written Opinion in International Applic. No. PCT/US2006/005774 dated Jun. 28, 2006 (European Patent Office).

International Search Report and Written Opinion in International Applic. No. PCT/US2006/005773 dated Jun. 28, 2006 (European Patent Office).

* cited by examiner

MAGNETIC FIELD AND FIELD GRADIENT ENHANCED CENTRIFUGATION SOLID-LIQUID SEPARATIONS

This application claims the benefit of U.S. Provisional Applications No. 60/545,063, filed Feb. 17, 2004; and 60/552,581, filed Mar. 12, 2004; each of which is incorporated in its entirety as a part hereof for all purposes.

FIELD OF THE INVENTION

This invention relates to continuous, batch and improved centrifugation solid-liquid separation processes.

BACKGROUND OF THE INVENTION

The use of solid-liquid separations is wide-spread and ranges from the large volume separations of minerals from solid-liquid mixtures to the small batch separations of high value products in the biotechnology or pharmaceutical industries. Gravitation, pressure, temperature, centrifugation, and fluid dynamics have dictated traditional solid-liquid separation for the past 50 years. Traditional solid-liquid separation typically consists of two primary steps. The first step is a mechanical step in which the solid particulate is separated from the liquid by mechanical means. The mechanical means can be mechanical pressure such as applied by a piston, gas pressure, hydrodynamic pressure, gravitational pressure, centrifugal pressure or a combination thereof wherein the liquid passes through a filter and the solid is retained by the filter. One problem encountered is solid loss as a result of solid "breaking through", i.e., passing through, the filter. An even more serious problem is that the mechanical separation step does not result in a complete separation. This necessitates the second step, a thermal drying process. The thermal drying process is very much less energy efficient, a factor of over 100-200 times less energy efficient, than the mechanical step. Since enormous volumes of materials are processed each year, more efficient mechanical solid-liquid separations will result in dramatic reductions in overall energy consumption by reducing downstream drying requirements. This would impact energy consumption since thermal drying accounts for a significant portion of total worldwide energy consumption.

In some instances, high-gradient magnetic field separation has been used to separate particular magnetic solids from a mixture of solids in a liquid.

An object of the present invention is to provide a more efficient and faster process for centrifugation solid-liquid separation.

SUMMARY OF THE INVENTION

This invention provides a process for centrifugation solid-liquid separation of a solid-liquid mixture containing magnetic particles, comprising simultaneously subjecting the solid-liquid mixture to localized magnetic field gradients and centrifugation. A rotating magnetic matrix is the source of the localized magnetic field gradients. The magnetic forces provided by these localized magnetic field gradients attract the magnetic particles to the rotating magnetic matrix. The process can be continuous or batch.

This invention also provides for the magnetic matrix to be in the presence of a magnetic field during the process.

The process of the instant invention is effective when the solid-liquid mixture contains ferromagnetic, ferrimagnetic, anti-ferromagnetic, paramagnetic or diamagnetic solids or when the solid-liquid mixture is seeded with ferromagnetic or paramagnetic particles. The process is particularly useful when magnetic particles are attached to the target materials to be separated, i.e., when "functionalized magnetic beads" are used and attached to high value target materials such as proteins, DNA plasmids and other biological materials.

Magnetic field gradients $\geq 100$ T/m have been found to be useful in the instant process. Preferred are high magnetic field gradients, i.e., gradients $\geq 5000$ T/m.

This invention also provides an improved process for centrifugation solid-liquid separation of a solid-liquid mixture containing magnetic particles, the improvement comprising simultaneously subjecting the solid-liquid mixture to centrifugation and a homogeneous magnetic field, a magnetic field gradient or both to promote agglomeration of the magnetic particles.

This invention further provides for subjecting a solid-liquid mixture containing magnetic particles to a homogeneous magnetic field, a magnetic field gradient or both prior to subjecting the solid-liquid mixture to a centrifugation separation process to promote agglomeration of the magnetic particles.

DETAILED DESCRIPTION OF THE PREFERRED EMBODIMENTS

The instant invention provides continuous, batch and improved centrifugation solid-liquid separation processes for solid-liquid mixtures containing magnetic particles.

The process of the invention comprises simultaneously subjecting the solid-liquid mixture to localized magnetic field gradients and centrifugation. A magnetic field gradient results in a magnetic force on the magnetic particles, i.e., the ferromagnetic, ferrimagnetic, anti-ferromagnetic, paramagnetic or diamagnetic particles, present in the solid-liquid mixture. A rotating magnetic matrix most conveniently produces the localized magnetic field gradients and the centrifugation required for this invention. The magnetic forces provided by the localized magnetic field gradients attract the magnetic particles to the magnetic matrix. Magnetic field gradients are preferably $\geq 100$ T/m. Most preferred are high magnetic field gradients, i.e., gradients $\geq 5000$ T/m.

Figure 1A:
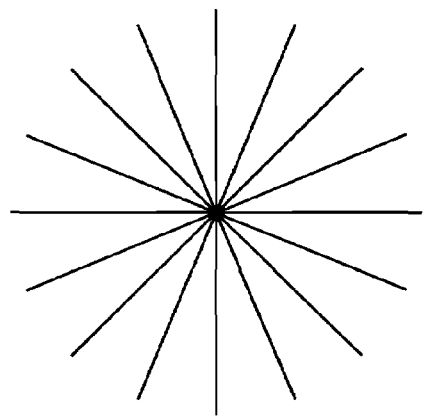
FIG. 1 shows some examples of configurations of the elements of the magnetic matrix.
Figure 1B:
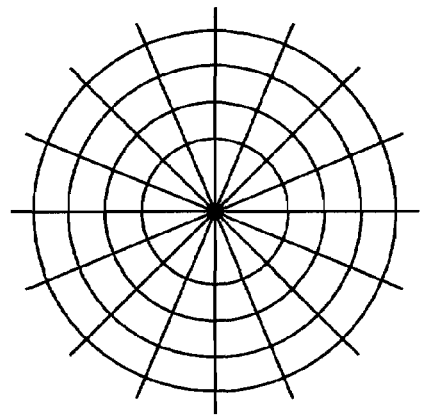
Figure 1C:
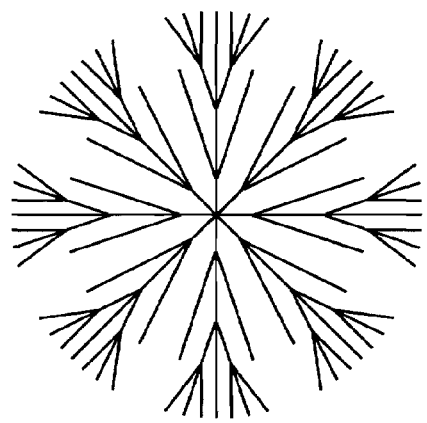
Figure 1D:
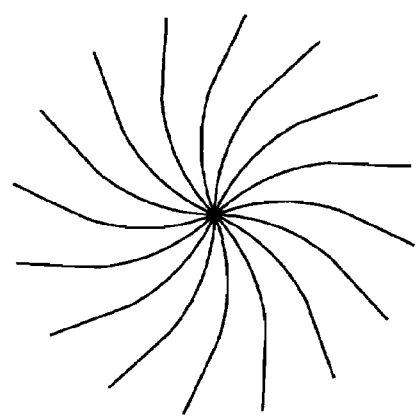
Figure 1E:
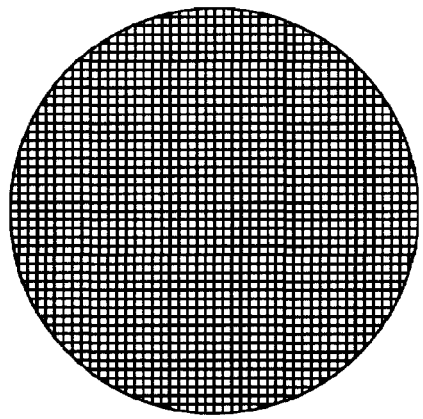

The magnetic matrix is constructed of any material that will provide localized magnetic field gradients. Typically, it is constructed of a material that will provide localized magnetic field gradients when placed in a magnetic field, e.g., steel wires, steel rods, steel wool, steel screen, etc. A solenoid or permanent magnet external to the container within which the magnetic matrix is rotating can produce the magnetic field. The magnetic matrix can consist of one element comprised of an array of magnetic wires or of multiple such elements that may be alike or different. The elements are arranged within the container. In one embodiment the element is planar and the plane is perpendicular to the axis of the container. Examples of some configurations the elements can take are shown in FIG. 1. FIG. 1a shows an element comprised of wires or rods extending radially outward from the center. FIG. 1b shows an element comprised of wires extending radially outward and wires in concentric circles. FIG. 1c shows an element comprised of branched wires extending outward. FIG. 1d shows an element comprised of curved wires extending outward from the center. FIG. 1e shows an element comprised of a screen. The wires can vary in shape and size. The elements can vary in diameter with respect to the diameter of the container. In one embodiment the elements used extend from the center, i.e., the axis of the container, to the inner wall of the container. The wires of the magnetic matrix can be free standing or can be supported. In another embodiment the element is not planar, but is rather in the shape of a cone with its axis along the axis of the container.

The magnetic matrix is rotated within a container into which the solid-liquid mixture is fed. The container within which the magnetic matrix is rotating can be a centrifuge with a rotating part, in which case the rotating part of the centrifuge and the rotating magnetic matrix both contribute to the centrifugal force experienced by the magnetic particles. The term "centrifuge" is used herein to include any container that has a rotating rotor, rotating screw or other rotating part that provides a centrifugal force. It includes decanters, separators and hydrocyclones that provide a centrifugal force. In this case, the magnetic matrix can be fixed to the rotor, screw or axle of the centrifuge and rotate at the same frequency as the centrifuge or be attached to a separate axle with a separate drive to independently adjust the rotation frequency. The difference in centrifuge and magnetic matrix rotation frequencies can be used as a parameter to adjust the separation process. The term "centrifuge" also include a static centrifuge with a tangential, i.e., radial, inlet which results in a spiral motion of the solid-liquid mixture and a centrifugal force.

Alternatively, the container within which the magnetic matrix is rotating can be a stationary one, i.e. one that does not rotate. In this case, the rotating magnetic matrix is the sole source of the centrifugal force.

The solid-liquid mixture can be fed into the container either axially or tangentially, i.e., radially. The solid-liquid mixture can include flocculents, surfactants, and sols. The solid-liquid mixture could alternatively be referred to as a suspension.

The magnetic particles in the solid-liquid mixture can be ferromagnetic, ferrimagnetic, anti-ferromagnetic, paramagnetic or diamagnetic. The solid-liquid mixture can also be seeded with ferromagnetic or paramagnetic particles to promote separation. The improved process is also effective when "functionalized magnetic beads" are used, i.e., when magnetic particles are attached to the target solids to be separated. High value target materials such as costly biomaterials can be attached to such magnetic particles in order to facilitate the separation process and reduce the loss of the costly biomaterial. "Functionalized magnetic beads" are magnetic particles that are "functionalized" by treating their surfaces with a biological or chemical entity known to bind to the targeted biological material. After the "functionalized magnetic beads" with the attached targeted materials are isolated, a separation step can separate the targeted materials from the functionalized magnetic beads. The magnetic beads can be reused. "Magnetic particles" as used herein includes all of the magnetic materials mentioned in this paragraph.

As a result of the magnetic forces, the magnetic particles are attracted to and adhere to the magnetic matrix. As a result of the centrifugal force, the magnetic particles move radially outward toward the inner wall of the container. The motion of the magnetic particles radially outward and their collection at the outer ends of the magnetic matrix results in a self-cleaning of the magnetic matrix so that additional magnetic particles can be collected.

When the rotating magnetic matrix is the sole source of the centrifugal force, essentially only magnetic particles experience the centrifugal force since they adhere to the rotating magnetic matrix. These magnetic particles move outward toward the inner wall of the container where they can be collected. When the process is carried out this way it can be especially useful for separating magnetic particles from a solid-liquid mixture containing magnetic particles that are to be recovered and non-magnetic particles that are considered part of the waste product. The process of the invention when carried out in this manner is especially suitable to be run as a continuous process. The solid-liquid mixture is continuously fed into the container within which the magnetic matrix is rotating. The magnetic particles are collected at the outer ends of the magnetic matrix and removed from the container as product. Any non-magnetic particles in the solid-liquid mixture are not attracted to the magnetic matrix and flow with the liquid through the container and are emitted from the container with the liquid in a waste stream.

Figure 2A:
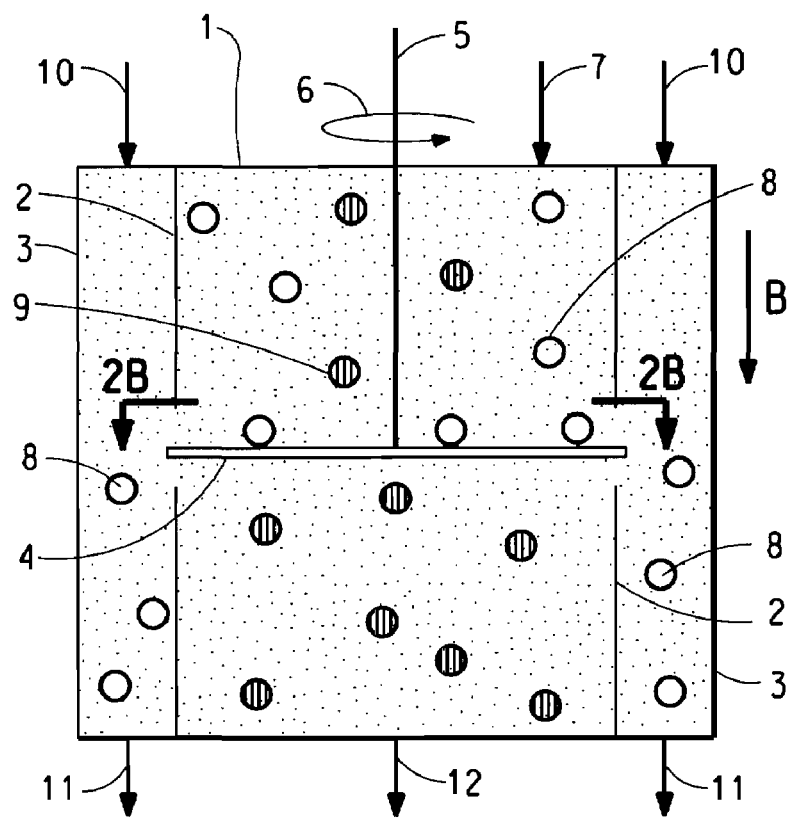
FIG. 2 is a schematic drawing showing one embodiment of the continuous centrifugation process.
Figure 2B:
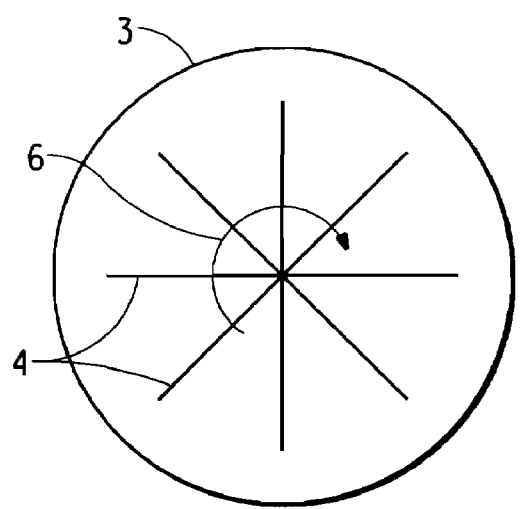
Figure 3A:
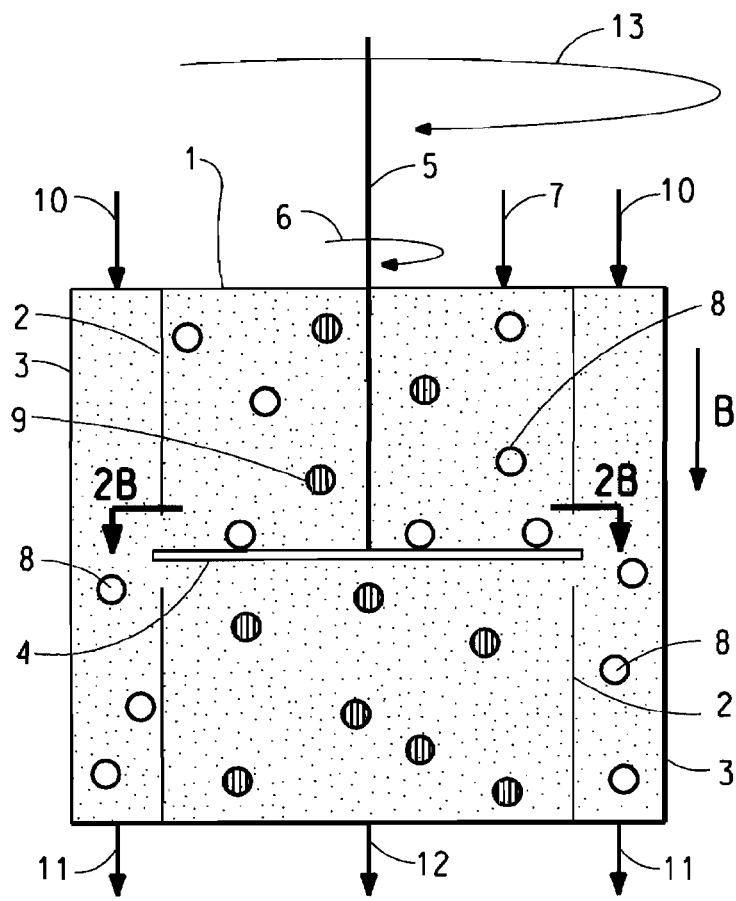
FIG. 3A shows an elevation view.
Figure 3B:
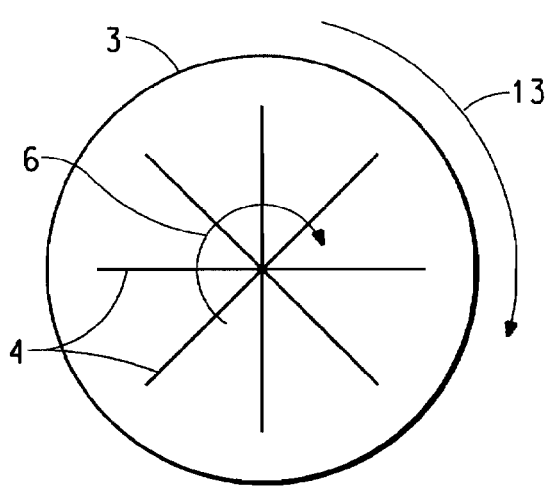
FIG. 3B shows a plan view, of an embodiment of this invention in which there is rotation of the container in which a rotating magnetic matrix is located.
Figure 4A:
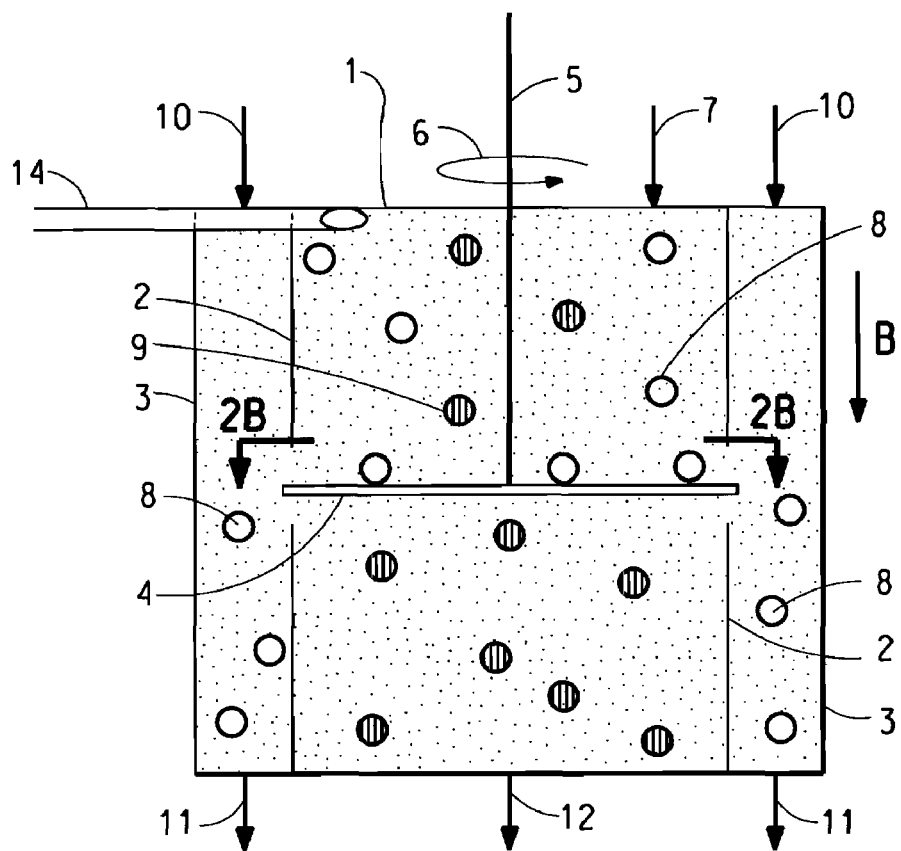
FIG. 4A shows an elevation view.
Figure 4B:
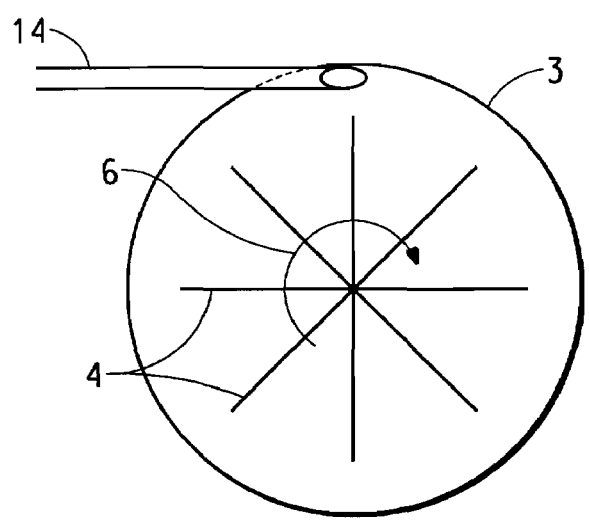
FIG. 4B shows a plan view, of an embodiment of this invention in which there is a rotating magnetic matrix, and another rotating part, located in a container.
Figure 5A:
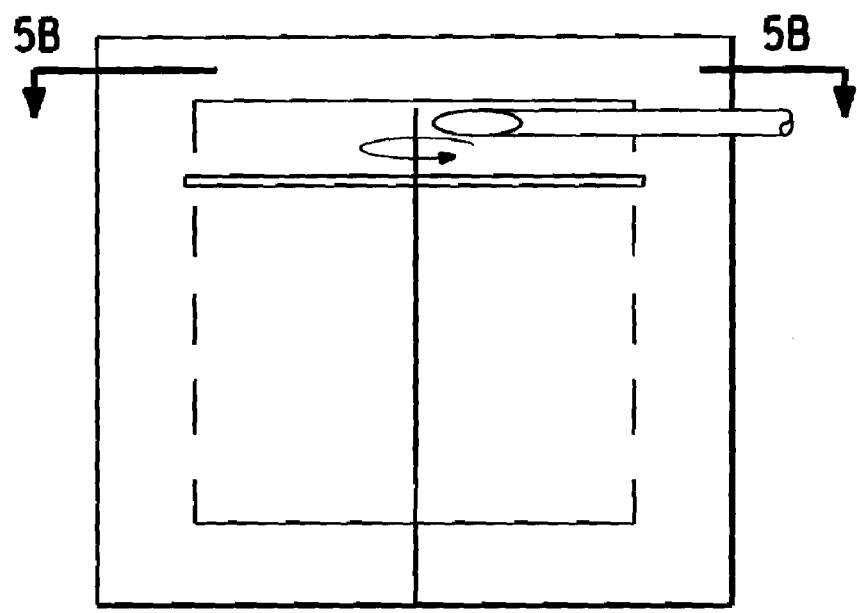
FIG. 5A shows an elevation view.
Figure 5B:
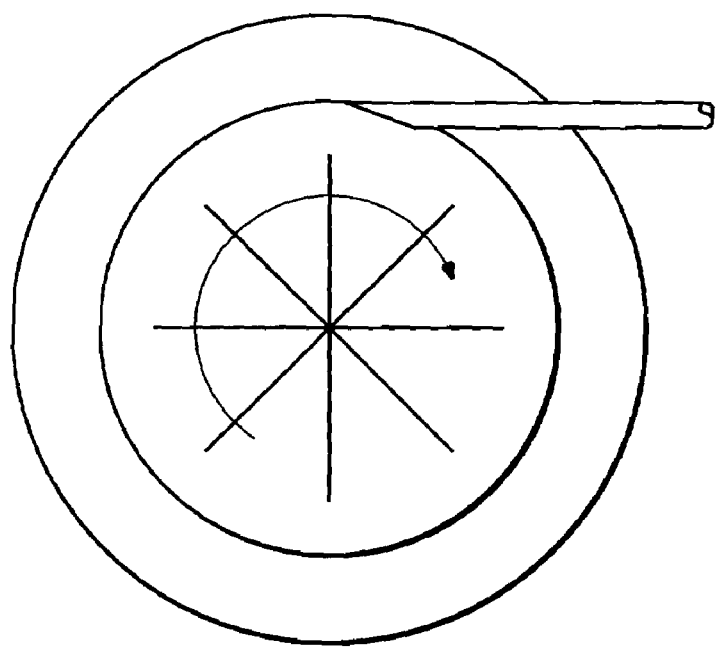
FIG. 5B shows a plan view, of an embodiment of this invention in which there is a tangential feed inlet into a container in which a rotating magnetic matrix is located.

A schematic drawing of one embodiment of the continuous process of the instant invention in which the rotating magnetic matrix is the sole source of the centrifugal force is shown in FIG. 2. FIG. 2a shows a vertical cross-section of a container 1 in the form of a right circular cylinder with two sets of concentric cylindrical walls. The vertical wall 2 encloses an inner cylinder and walls 2 and 3 enclose an outer cylindrical shell. The rotating magnetic matrix 4 is attached to shaft 5. Shaft 5 is rotated as indicated by arrow 6. The arrow labeled B indicates the presence and direction of the magnetic field. The field can be in other directions, but preferably is parallel to the axis of the container or has a large component parallel to the axis of the container. FIG. 2b is a horizontal cross-ssection showing the configuration of the rotating magnetic matrix. In this case the magnetic matrix is comprised of only one element but similar or different elements could be attached to and rotated by shaft 5. The configuration shown for the element is similar to that shown in FIG. 1a, i.e., with wires or rods extending radially outward from the center. The wires or rods extend from the shaft, through a hole in wall 2 and into the outer cylindrical shell. The solid-liquid mixture is continuously fed into the inner cylinder as indicated by arrow 7. The solid-liquid mixture is comprised of magnetic particles shown as spheres with white centers 8, non-magnetic solids shown as solid black spheres 9 and the liquid. The solid-liquid mixture flows from the top of the inner cylinder toward the bottom as a result of any applied pressure and gravity. As a result of the magnetic field gradient at the magnetic matrix and the resulting magnetic force, the magnetic particles are attracted to and adhere to the magnetic matrix. High magnetic field gradients are preferred since they result in larger forces and stronger adherence of the magnetic particles to the magnetic matrix. As a result of the centrifugal force provided by the rotating magnetic matrix, the magnetic particles move radially outward toward wall 2. They enter the outer cylindrical shell through the hole in wall 2. A liquid phase buffer solution is fed into the outer cylindrical shell as indicated by arrows 10. As the magnetic particles pass through the hole in wall 2 and enter the outer cylindrical shell, they are caught up in the flow of the buffer solution and emitted from the apparatus as indicated by arrows 11. The buffer solution is chosen so as to facilitate the separation of the magnetic particles from the solution. When the magnetic particles are functionalized magnetic beads with target products attached, the target products are separated from the magnetic beads and the magnetic beads are reused. The non-magnetic particles are not attracted to the magnetic matrix, experience essentially no centrifugal force, continue to flow with the liquid of the solid-liquid mixture through the inner cylinder and are emitted from the inner cylinder with the liquid as indicated by arrow 12.

The process of the invention can be used for selective separation, i.e., to separate magnetic particles from non-magnetic particles and a liquid. This process can also be used to separate magnetic particles from a liquid, or to classify different sized magnetic particles. The high gradient magnetic fields result in high magnetic forces that allow the separation of smaller magnetic particles and therefore enable the use of smaller particles as magnetic beads. Agglomeration as a result of the presence of a magnetic field facilitates such separations. Magnetic nanoparticles can be separated by the process of the invention.

This invention also provides an improved process for centrifugation solid-liquid separation of a solid-liquid mixture containing magnetic particles, the improvement comprising simultaneously subjecting the solid-liquid mixture to centrifugation and a homogeneous magnetic field, a magnetic field gradient or both to promote agglomeration of the magnetic particles. In one embodiment an oscillating magnetic field is used in conjunction with centrifugation.

The improvements that results from the application of the homogeneous magnetic field are due to structure changes within the mixture or the porous structure of the filter-cake. A homogeneous, i.e., uniform, magnetic field can align or anti-align magnetic particles. Thus, the applied homogeneous magnetic field changes the structure of the solid-liquid mixture. The solid particles agglomerate in the presence of the magnetic field. When the particles agglomerate, they increase their effective diameter. The agglomerate has a higher mass and therefore experiences a higher centrifugal force than a single magnetic particle. Therefore the agglomeration of particles results in a decrease in the time for solid-liquid separation. The homogeneous field can be applied at any angle with respect to centrifugal force.

With a magnetic field gradient there is a magnetic force on the magnetic particles. The magnetic field gradient can contribute to agglomeration with the advantages discussed previously.

It is also advantageous to subject the solid-liquid mixture to a homogeneous magnetic field, a magnetic field gradient or both prior to the solid-liquid mixture being subjected to a centrifugation separation process in order to agglomerate the solid particles. In one embodiment an oscillating magnetic field is used in conjunction with centrifugation. Following this agglomeration step, the solid-liquid can be subjected to an additional homogeneous magnetic field, a magnetic field gradient or both in conjunction with the centrifugation process. The centrifugation process can be the continuous process of the instant invention or a conventional centrifugation process without the magnetic matrix.

EXAMPLE OF THE INVENTION

The purpose of this Example is to demonstrate the improvement as a result of applying a magnetic during a centrifugation separation process.

A static plexiglass centrifuge with a diameter of 35 mm and a length of 94 mm was used to measure the separation of a solid-liquid mixture consisting of about 0.5 volume percent of magnetite, $Fe_3O_4$, in water. The magnetite had a median particle size of 20 μm. Near one end of the centrifuge there is a tangential inlet with a nozzle diameter of 2 mm. Feeding the solid-liquid mixture into the tangential inlet results in a spiral movement of the mixture and a centrifugal force on the magnetite particles. At the other end of the centrifuge there are two outlets, a tangential underflow outlet and an axial overflow outlet. The feed flow-rate was 3.9 l/min.

As a result of the centrifugal force, the magnetite particles can be expected to move radially outward and be collected in the underflow outlet while the clear water leaves the process chamber through the axial overflow outlet.

The process was run with no applied magnetic field and 0.39 volume percent of magnetite was found in overflow outlet stream.

The static centrifuge was then placed in a homogeneous magnetic field, i.e., B=0.035 T, the very small remnant magnetic field of a superconducting magnet. The process was run in the presence of this small magnetic field and 0.29 volume percent of magnetite was found in overflow outlet stream. This is a 25% reduction in the volume percent of magnetite in the overflow outlet stream. This shows the benefit of particle agglomeration and the improvement in separation when a magnetic field is applied during a centrifugation separation process.

What is claimed is:

1. A process for the centrifugal separation of magnetic particles from a solid-liquid mixture that resides in a container, comprising (a) subjecting the mixture to a magnetic field from a source external to the container, (b) rotating a magnetic matrix within the container; and (c) rotating the container.

2. A process according to claim 1 wherein the magnetic matrix and container rotate at the same speed.

3. A process according to claim 1 wherein the magnetic matrix and container rotate at a different speed.

4. A process according to claim 1 wherein the mixture is subjected to a homogeneous magnetic field, a magnetic field gradient or both prior to or while rotating the magnetic matrix.

5. A process according to claim 1 which is a continuous process or a batch process.

6. A process according to claim 1 wherein the magnetic matrix comprises one element comprised of an array of magnetic wires.

7. A process according to claim 1 wherein the magnetic matrix comprises two or more elements each of which is comprised of an array of magnetic wires.

8. A process according to claim 1 wherein the container has an axis and a wall, and wherein the magnetic matrix extends from the axis of the container to a wall of the container.

9. A process according to claim 1 wherein rotating the magnetic matrix generates localized magnetic field gradients having magnitudes $\geq 100$ T/m.

10. A process according to claim 1 wherein the magnetic particles comprise functionalized magnetic beads attached to biological materials.

11. A process according to claim 1 wherein the mixture comprises magnetic particles of different size.

12. A process according to claim 1 wherein the mixture comprises magnetic particles and non-magnetic materials.

13. A process according to claim 1 wherein the magnetic matrix comprises one element comprised of an array of magnetic wires.

14. A process according to claim 1 wherein the magnetic matrix comprises two or more elements each of which is comprised of an array of magnetic wires.

15. A process for the centrifugal separation of magnetic particles from a solid-liquid mixture that resides in a container and is subject to a magnetic field, comprising (a) rotating the container and/or rotating a magnetic matrix within the container, and (b) subjecting the mixture to a homogeneous magnetic field, or both a homogeneous magnetic field and a magnetic field gradient, prior to, and during the time of, the rotation of the container and/or magnetic matrix.

16. A process according to claim 15 wherein the magnetic matrix is planar or in the shape of a cone.

17. A process according to claim 15 wherein the container and the magnetic matrix are both rotated, and are rotated at the same speed.

18. A process according to claim 15 wherein the container and the magnetic matrix are both rotated, and are rotated at different speeds.

19. A process according to claim 15 which is a continuous process or a batch process.

20. A process according to claim 15 wherein the magnetic matrix comprises one element comprised of an array of magnetic wires.

21. A process according to claim 15 wherein the magnetic matrix comprises two or more elements each of which is comprised of an array of magnetic wires.

22. A process according to claim 15 wherein the container has an axis and a wall, and wherein the magnetic matrix extends from the axis of the container to the inner wall of the container.

23. A process according to claim 15 wherein rotating the magnetic matrix generates localized magnetic field gradients having magnitudes $\geq 100$ T/m.

24. A process according to claim 15 wherein the magnetic particles comprise functionalized magnetic beads attached to biological materials.

25. A process according to claim 15 wherein the mixture comprises magnetic particles or different size.

26. A process according to claim 15 wherein the mixture comprises magnetic particles and non-magnetic materials.

27. A process for the centrifugal separation of magnetic particles from a solid-liquid mixture that resides in a cylindrical container and is subject to a magnetic field; wherein the container has an opening about its circumference; comprising (a) rotating within the container a magnetic matrix that extends to or through the opening; (b) adhering particles to the magnetic matrix and moving the particles on the magnetic matrix toward the circumferential opening; and (c) passing the particles out through the circumferential opening.

28. A process according to claim 27 further comprising a step of subjecting the mixture to a homogeneous magnetic field, a magnetic field gradient or both prior to or while rotating the magnetic matrix.

29. A process according to claim 27 which is a continuous process or a batch process.

30. A process according to claim 27 wherein the magnetic matrix comprises one element comprised of an array of magnetic wires.

31. A process according to claim 27 wherein the magnetic matrix comprises two or more elements each of which is comprised of an array of magnetic wires.

32. A process to claim 27 wherein for the magnetic matrix is planar or in the shape of a cone.

33. A process according to claim 27 wherein rotating the magnetic matrix generates localized magnetic field gradients having magnitudes $\geq 100$ T/m.

34. A process according to claim 27 wherein the magnetic particles comprise functionalized magnetic beads attached to biological materials.

35. A process according to claim 27 wherein the mixture comprises magnetic particles of different size.

36. A process according to claim 27 wherein the mixture comprises magnetic particles and non-magnetic materials.

37. A process according to claim 27 wherein the magnetic field is an oscillating magnetic field.

38. A process according to claim 27 further comprising a step of rotating the container.

39. A process according to claim 27 wherein the magnetic matrix is planar.

40. A process according to claim 39 wherein the magnetic matrix is in planar alignment with the circumferential opening.

* * * * *